US008321263B2

(12) United States Patent
McCauley

(10) Patent No.: US 8,321,263 B2
(45) Date of Patent: Nov. 27, 2012

(54) PROCESSING AND DISPLAY OF SERVICE PROVIDER PERFORMANCE DATA

(75) Inventor: Sandra M. McCauley, Burlington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 700 days.

(21) Appl. No.: 12/425,885

(22) Filed: Apr. 17, 2009

(65) Prior Publication Data
US 2010/0268575 A1 Oct. 21, 2010

(51) Int. Cl.
G06Q 10/00 (2012.01)
(52) U.S. Cl. ............... 705/7.41; 705/7.11; 705/7.38; 705/7.39
(58) Field of Classification Search ........ 705/7.11–7.41, 705/14.1–14.73
See application file for complete search history.

(56) References Cited

U.S. PATENT DOCUMENTS

| 5,734,890 | A  | * | 3/1998  | Case et al. .................. 1/1 |
| 5,765,138 | A  | * | 6/1998  | Aycock et al. ............ 705/7.23 |
| 6,556,974 | B1 | * | 4/2003  | D'Alessandro ............ 705/7.32 |
| 6,604,084 | B1 | * | 8/2003  | Powers et al. ............ 705/7.41 |
| 6,647,374 | B2 | * | 11/2003 | Kansal ..................... 705/37 |
| 7,010,496 | B2 | * | 3/2006  | Wong ...................... 705/7.38 |
| 7,302,405 | B2 |   | 11/2007 | Hoskin et al. |
| 7,499,871 | B1 | * | 3/2009  | McBrayer et al. ........ 705/7.13 |
| 7,617,154 | B1 | * | 11/2009 | Melling et al. ............ 705/40 |
| 7,831,463 | B2 | * | 11/2010 | Nagar ..................... 705/7.38 |
| 2002/0072953 | A1 | * | 6/2002  | Michlowitz et al. ........ 705/10 |
| 2002/0178049 | A1 | * | 11/2002 | Bye ........................ 705/11 |
| 2003/0182413 | A1 | * | 9/2003  | Allen et al. ............... 709/223 |
| 2004/0068431 | A1 | * | 4/2004  | Smith et al. .............. 705/10 |

(Continued)

OTHER PUBLICATIONS

Karen L. Hartley; "Defining Effective Service Level Agreements for Network Operation and Maintenance" Bell Labs Technical Journal 9(4), 139-143 (2005) © 2005 Lucent Technologies Inc. Published by Wiley Periodicals, Inc. Published online in Wiley InterScience (www.interscience.wiley.com). o DOI: 10.1002/bltj.20067.*

(Continued)

Primary Examiner — Romain Jeanty
Assistant Examiner — Alan S Miller
(74) Attorney, Agent, or Firm — Volpe and Koenig, P.C.

(57) ABSTRACT

Disclosed are computing systems, apparatus, methods, and articles of manufacture for processing and displaying service provider performance data. In insurance and related industries, service providers perform assignments such as repairing smoke or water damage. Assignments may be performed pursuant to a service level agreement (SLA) between a provider and an insurance company. Service provider performance data reflects how well service providers perform their assigned tasks, and may contain subjective or qualitative values. Service provider performance data is stored in computer-readable storage media and is accessed by a computing system. The computing system selects a number of performance criteria to analyze, such as quality of service criterion, cycle time, and customer satisfaction. The computing system aggregates performance data related to the selected criteria and generates quantitative values from subjective or qualitative values. The computing system generates a vendor quality index (VQI) based on the quantified data. The generated quantitative values and VQI may be rendered on a display device or printed on a printer to facilitate objective comparisons between different service providers. Based on the generated quantitative values and VQI, the computing system may adjust parameters that affect how the VQI is determined, initiate electronic debits or credits to accounts corresponding to service providers, and/or generate user alerts.

24 Claims, 5 Drawing Sheets

U.S. PATENT DOCUMENTS

| | | | |
|---|---|---|---|
| 2004/0088411 A1 | 5/2004 | Jakubowski et al. | |
| 2004/0162763 A1 | 8/2004 | Hoskin et al. | |
| 2004/0199416 A1* | 10/2004 | Heina et al. | 705/10 |
| 2005/0216395 A1 | 9/2005 | Behmoiras et al. | |
| 2005/0234937 A1* | 10/2005 | Ernest et al. | 707/100 |
| 2006/0212359 A1* | 9/2006 | Hudgeon | 705/26 |
| 2008/0114608 A1* | 5/2008 | Bastien | 705/1 |
| 2010/0145788 A1* | 6/2010 | Kardokas | 705/14.34 |

OTHER PUBLICATIONS

Yohimitsu et al. (Yohei Yoshimitsu, Koji Kimita, Tatsunori Hara, Yoshiki Shimomura, Tamio Arai; "Proposal of a Measuring Method of Customer's Attention and Satisfaction on Services" Advances in Life Cycle Engineering for Sustainable Manufacturing Businesses, 2007, Part 4, C3, 417-422, DOI: 10.1007/978-1-84628-935-4_72.*

Mei-Fang Chen; Gwo-Hshiung Tzeng; Ding, C.G.; , "Fuzzy MCDM approach to select service provider," Fuzzy Systems, 2003. FUZZ '03. The 12th IEEE International Conference on , vol. 1, no., pp. 572-577 vol. 1, May 25-28, 2003 doi: 10.1109/FUZZ.2003.1209427.*

Wei-Li Lin; Chi-Chun Lo; Kuo-Ming Chao; Younas, M.; , "Fuzzy Consensus on QoS in Web Services Discovery," Advanced Information Networking and Applications, 2006. AINA 2006. 20th International Conference on , vol. 1, no., pp. 791-798, Apr. 18-20, 2006 doi: 10.1109/AINA.2006.186.*

* cited by examiner

FIG.4

Scorecard Results – Year End  400

Stats  402                                              Service Provider

| | 1st Qtr | 2nd Qtr | 3rd Qtr | 4th Qtr | Total |
|---|---|---|---|---|---|
| Net Assignments | 300 | 250 | 50 | 400 | 1000 |
| Total Spend (Invoiced) | 4200 | 4000 | 400 | 11400 | 20000 |
| Average Job Cost | 14 | 16 | 8 | 28.5 | 20 |

Cycle Time 30% = .27   416   418   406

Contract SLAs – Compliance to standards (Total # COMPLIANT to the standards below)

Customer Response    98%
    Job Dispatch    80%
    Verbal Report to Adjuster    92%
    AVG. of all 3: 90%

.90 x .30wt = .27

Quality of Service 50% = .24   412   414   404

Contract SLAs (COMPILATION OF WEIGHTED AVERAGES)

Reinspection Results   50% = .10

Net deviations > 9%    Unsatisfactory   400/1000 = 40%
Net deviations < 9%    Standard   600/1000 = 60%
Standard – Unsatisfactory = 200/1000 = .20 x .50wt = .10

CQI Results   50% = .38

1.0 – 1.5    Unsatisfactory   120/1000 = 12%
3.0    Standard   880/1000 = 88%
Standard – Unsatisfactory = 760/1000 = .76 x .50wt = .38

.10 + .38 = .48 x .50wt = .24

Customer Satisfaction 20% = .11   408

Contract SLAs   420   422

Service Provider reports a 55% Compliance result = .11  (.55 x .20wt)
Based on customer responses (Averaging for 12 different questions)

VQI: 62% Score FINAL ——— 410

PROCESSING AND DISPLAY OF SERVICE PROVIDER PERFORMANCE DATA

FIELD OF INVENTION

The current disclosure relates to computing systems, apparatus, methods, and articles of manufacture for processing and displaying service provider performance data.

BACKGROUND

Service level agreements (SLAs) and other contracts play a significant role in the operation of many businesses. For example, in the insurance industry, insurers may have SLAs with numerous service providers (or vendors) who provide various desired services to their customers when losses occur. Examples of such services may include water damage repair and mitigation, fire and smoke damage repair, and the like.

Service providers under an SLA are tasked to perform various assignments based on the terms of the SLA. When a service provider is tasked and performs an assignment, a record of that assignment is typically generated. These assignment records may include various information about the performance of the assignment by the service provider, including a number of types of information such as descriptions of the assignment, the procedures followed in performing the assignment, costs of performing the assignment, receipts, bills, reports produced by the service provider and/or the assigning company, evaluations of performance and/or customer satisfaction, etc. Because of the large number of assignments that are performed by providers and the amount of information typically contained in the record for each assignment, it may be difficult for the assigning company to efficiently, yet accurately, assess the performance of the service provider.

Even after the assigning company has identified and separated out viable performance data from each record, it may still be difficult to develop an overall assessment of the service provider's performance. In many cases, much of the performance data contained in the assignment records is of a subjective and qualitative nature. This makes aggregating the performance data over multiple assignments difficult. When data is successfully aggregated, the large volume of the data presents challenges in terms of presenting the data to users in formats that are concise and easily comprehensible. Furthermore, the subjective and qualitative nature of the data makes it extremely difficult to compare the performance of different service providers, particularly if these service providers are performing under SLAs with different terms. This becomes ever more difficult if the providers are performing different types of tasks (e.g. water damage repair versus fire and smoke damage repair). Therefore, different means of performance assessment may be necessary. However, it would still be desirable to compare the performance of the different service providers taking into account the differences in their contract terms. Additionally, because of the current verbose formats for the presentation of service provider data, dissemination of the data requires extensive use of color print-outs, paper, binders, and other materials that have a negative environmental impact. Out of concern for the environment, it would be desirable to present service provider performance data in a compact format that optimizes the use of available resources.

Current technologies do not meet the needs of users as described above. Therefore, new technologies are required to aggregate and quantify subjective performance data and to present the performance data to users in a concise and actionable format.

SUMMARY

Disclosed are computing systems, apparatus, methods, and articles of manufacture for processing and displaying service provider performance data. Service provider performance data reflects how well service providers perform their assigned tasks, and may contain subjective or qualitative values.

An apparatus for determining a vendor quality index (VQI) of a service provider on assignments tasked to the service provider includes a performance data processor configured to receive performance data including a plurality of records, where each record corresponds to an assignment tasked to the service provider pursuant to a service level agreement (SLA). The apparatus further includes an aggregation processor configured to aggregate and classify the performance data, a quantifying processor configured to determine quantitative performance values based on the aggregated performance data, and a VQI processor configured to calculate a VQI from the quantitative performance values.

An apparatus for determining a vendor quality index (VQI) of a service provider includes a memory device configured to receive service provider performance data related to services performed by the service provider; the service provider performance data including subjective performance data. The apparatus further includes a processor. The processor is configured to select a plurality of performance criteria and to determine, for each of the plurality of performance criteria, a quantified performance criterion value based on the service provider performance data. The processor is further configured to determine the VQI as a weighted sum based on the performance criterion values and a plurality of weighting factors.

A computer-readable medium has processor-executable instructions stored thereon which, when executed by at least one processor, will cause the at least one processor to perform a method for determining a vendor quality index (VQI) of a service provider. The at least one processor receives service provider performance data related to services performed by the service provider; the service provider performance data including subjective performance data. Further, the at least one processor selects a plurality of performance criteria, and determines, for each of the plurality of performance criteria, a quantified performance criterion value based on the service provider performance data. And the at least one processor determines the VQI as a weighted sum based on the performance criterion values and a plurality of weighting factors.

A system for determining a vendor quality index (VQI) of a service provider includes a memory device configured to receive service provider performance data related to services performed by the service provider; the service provider performance data including subjective performance data. The system further includes a processor. The processor is configured to select a plurality of performance criteria and to determine, for each of the plurality of performance criteria, a quantified performance criterion value based on the service provider performance data. The processor is further configured to determine the VQI as a weighted sum based on the performance criterion values and a plurality of weighting factors.

A method for determining a vendor quality index (VQI) of a service provider includes at least one processor receiving service provider performance data related to services performed by the service provider; the service provider performance data including subjective performance data. The method further includes the at least one processor selecting a plurality of performance criteria, the at least one processor determining, for each of the plurality of performance criteria, a quantified performance criterion value based on the service provider performance data, and the at least one processor determining the VQI as a weighted sum based on the performance criterion values and a plurality of weighting factors.

BRIEF DESCRIPTION OF THE DRAWINGS

A more detailed understanding may be had from the following description, given by way of example in conjunction with the accompanying drawings wherein:

FIG. 4 shows an example graphical depiction (or "scorecard") of data generated by the computing systems of FIGS. 1 and 2.

DETAILED DESCRIPTION

When referred to hereafter, the term "processor" includes but is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. When referred to hereafter, the term "computer-readable storage medium" includes but is not limited to a register, a cache memory, a read-only memory (ROM), a semiconductor memory device such as a Dynamic Random Access Memory (D-RAM), Static RAM (S-RAM), or other RAM, a magnetic medium such as a flash memory, a hard disk, a magneto-optical medium, an optical medium such as a CD-ROM, a digital versatile disk (DVDs), or Blu-Ray disc (BD), other volatile or non-volatile memory, or other type of device for electronic data storage. When referred to hereafter, the term "memory device" is a device configurable to read and/or write data to/from one or more computer-readable storage media.

When referred to hereafter, the term "display device" includes but is not limited to a monitor or television display, a plasma display, a liquid crystal display (LCD), or a display based on technologies such as front or rear projection, light emitting diodes (LEDs), organic light-emitting diodes (OLEDs), or Digital Light Processing (DLP). When referred to hereafter, the term "input device" includes but is not limited to a keyboard, a mouse, a trackball, a scanner, a touch screen, a touch pad, a stylus pad, and/or other device that generates electronic signals based on interactions with a human user. Input devices may operate using technologies such as Bluetooth, Universal Serial Bus (USB), PS/2, or other technologies for data transmission.

Figure 1:
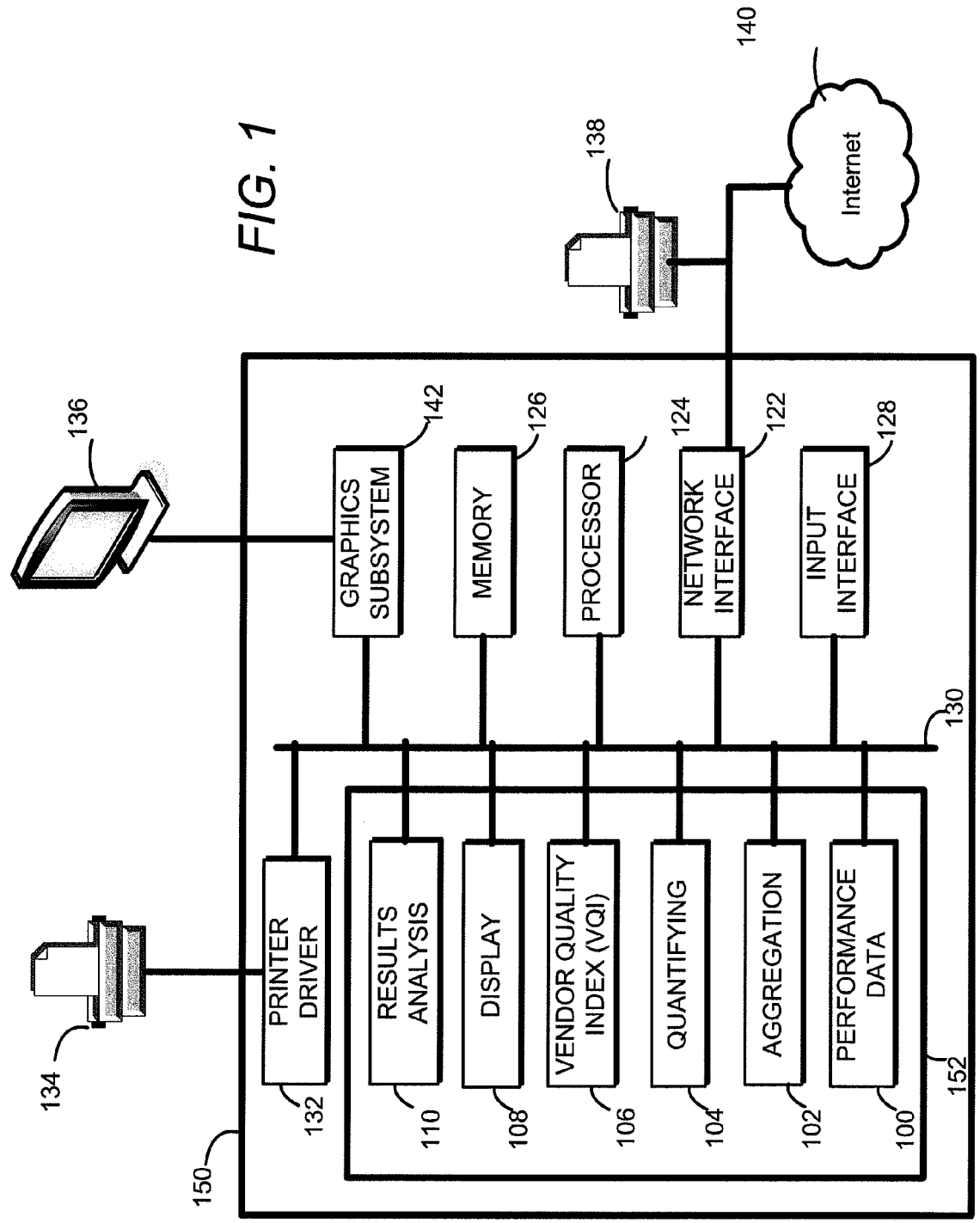
FIG. 1 shows an example computing system for determining the Vendor Quality Index of a service provider on assignments tasked to the service provider.

FIG. 1 shows an example computing system 150 for determining the Vendor Quality Index (VQI) of a service provider on assignments tasked to the service provider. The VQI of a service provider indicates the service provider performance in a matter that is easily compared both to ideal performance standards and to performance of other service providers of the same business or organization. As described in further detail below, the VQI is a weighted sum based on the performance criterion values and a plurality of weighting factors. The example computing system 150 includes a processor 124, a memory device 126, and a communications bus 130 for communications of data between components. Computing system 150 optionally includes a number of components, including graphics subsystem 142, network interface 122, input interface 128, and printer driver 132. Graphics subsystem 142 may provide data to and/or drive display device 136. Network interface 122 provides a wired or wireless network connection over which the computing system 150 may connect to networked printer 138 or to the Internet 140. Input interface 128 may be, for example, a wireless connection or data port capable of receiving data from one or more input devices. Printer driver 132 provides data to and/or drives local printer 134.

Computing system 150 includes a subsystem 152 for evaluating service provider performance data, determining the VQI based on the performance data, generating graphical output data to display results, and analyzing the VQI and related data. The subsystem 152 includes performance data module 100, aggregation module 102, quantifying module 104, VQI module 106, display module 108, and results analysis module 110. The modules 100, 102, 104, 106, 108, 110 may be implemented as software modules, specific-purpose processor elements, or as combinations thereof. Suitable software modules include, by way of example, an executable program, a function, a method call, a procedure, a routine or sub-routine, a set of processor-executable instructions, a script or macro, an object, or a data structure. Some or all of the modules 100, 102, 104, 106, 108, 110 may be implemented as, by way of further example, modules or sub-routines within a spreadsheet program such as Microsoft Excel®, a database program, or other type of program. Data used by and/or generated by the modules 100, 102, 104, 106, 108, 110 may be stored in memory device 126. The processor 124 is configurable to operate and control the operation of the modules 100, 102, 104, 106, 108, 110 and to control communications between the modules 100, 102, 104, 106, 108, 110 and other components of computing system 150 such as the printer driver 132, graphics subsystem 142, memory device 126, network interface 122, and input interface 128.

Performance data module 100 provides performance data to aggregation module 102. Performance data includes records corresponding to assignments tasked to a service provider. Performance data module 100 may obtain performance data from one or more files stored in memory device 126, or from one or more database management systems, additional computer-readable storage media, or other devices (not depicted) via local interfaces and/or network interface 122.

Performance data may be categorized according to performance criteria used to assess the performance of the service provider, such as quality of service, cycle times, and/or customer satisfaction. Each performance criteria may be further defined in terms of associated sub-criteria (or "performance categories"). Performance categories associated with quality of service may include: an actual assignment cost category; an assignment reinspection cost category; a Customer Quality Index (CQI) category; one or more audit categories, related to ad hoc or scheduled audits and/or audits such as Physical Damage Audits (PDAs); a periodic business review category, related to business reviews performed on a regular basis such as quarterly, yearly, or otherwise; and a vendor self-assessment category. Performance categories associated with cycle times may include: a customer response time category; a customer contact time category; an inspection time category; an estimate submission time category; a job dispatch time category; a verbal report time category; a written report time category; an Additional Living Expense (ALE) category, related to the placement of homeowners in temporary residences while their homes are repaired; and a contractor services time category, related to measurements of whether contractors contact the insured and begin and finish tasks in a timely manner. A performance category associated with customer satisfaction may include a customer satisfaction survey results category. Additionally, performance criteria and/or performance categories may include environmental ratings reflecting the extent to which service providers engage in environmentally-sensitive (or "green") practices.

Aggregation module 102 selects one or more performance criteria from the available performance criteria, and aggregates and classifies performance data in performance categories associated with the selected performance criteria. The selection of performance criteria may be performed based on one or more criteria selection parameters. The values for the criteria selection parameters may be based on user input received via input interface 128. The criteria selection parameters may indicate, for example, that criteria related to terms specified (explicitly or implicitly) in a relevant SLA should be selected. Criteria specified in the SLA may include, for example, average cost per assignment (service event) and average initial response time. The criteria selection parameters may alternatively be based on types of assignments handled by a service provider. For example, criteria selection parameters may indicate that where a service provider performs water damage repair services, a time cycle criteria may be selected, but that different criteria are selected where a service provider performs smoke damage repair services. This configuration of criteria selection parameters would reflect that water damage repair is frequently time-critical, and that the likelihood of additional damage occurring during a delay in the performance of smoke damage repair may be less. Criteria selection parameters may additionally indicate that more or less parameters should be selected based on user input indicating that a more or less in-depth analysis is required.

Aggregation module 102 may organize performance data in performance categories related to the selected performance criteria into a table data structure. As an example, each row in the table data structure may correspond to a record for a performance of an assignment (service event), and each column may include performance data for one performance category. Alternatively, different row and column arrangements may be used. Aggregation module 102 may provide a graphical representation of the table data structure to display device 136. The graphical representation may be, for example, a spreadsheet or similar representation, and may be rendered to a user via graphics subsystem 142 and display device 136.

Quantifying module 104 determines a quantitative performance value for each selected performance criteria. The quantifying module 104 selects one or more quantifying procedures to use from a set of available quantifying procedures, and generates the quantitative performance values by applying the selected quantifying procedures to the performance data as aggregated and classified by aggregation module 102.

Many different procedures may be performed by quantifying module 104 to quantify the performance criteria. Below is a list of several example quantifying procedures. However, this list is illustrative only and is not intended to be limiting:

i) Quantifying module 104 groups records into a number of qualitative categories associated with the performance criteria, based on performance data in the records. Each qualitative category corresponds to a range of values in the performance data. By way of example, records may indicate subjective performance rating data for a category on a scale of possible values of 1 to 10. Records with values from 1 to 4 may be assigned to an "unsatisfactory" category, and records with values from 5 to 10 may be assigned to a "satisfactory" category. The quantifying module 104 associates "unsatisfactory" records with a quantitative value of 0, and associates "satisfactory" records with a quantitative value of 1. Accordingly, category values for the records may be determined based on the categories to which the records have been assigned. For example, a "unsatisfactory" record will have a category value of 0 and a "satisfactory" record will have a category value of 1. Quantifying module 104 then determines a sum or average of the determined category values to derive the performance value corresponding to the performance criteria.

ii) Quantifying module 104 determines what fraction of the records indicates that a target value for the performance criterion was exceeded, and it determines the performance value based on the determined fraction.

iii) Quantifying module 104 selects a subset of records that include performance data related to the performance criterion. Records are grouped in the subset according to a number of qualitative categories associated with the performance criteria, based on performance data in the records. Category values are determined for records based on categories to which the records have been assigned. Quantifying module 104 determines an average of the category values to derive the performance value corresponding to the performance criteria.

iv) Quantifying module 104 selects a subset of records that include performance data related to the performance criterion. A determination is made of the fraction of the records in the subset of records which indicate that a target value for the performance criterion was exceeded. The quantifying module 104 determines the performance value based on the determined fraction.

The selection of the quantifying procedures used to determine quantitative performance values may be performed by the quantifying module 104 based on one or more procedure selection parameters. The procedure selection parameters may be based on user input received via input interface 128.

The procedure selection parameters may indicate, for example, that quantifying procedures should be selected based on the format and/or content of the performance data. Performance data may vary in format and content between the different performance criteria, and even between different assignments for the same performance criteria. For example, two records associated with two different assignments may include data for different performance categories, possibly due to different data recording practices. Alternatively, the two records may include the same types of performance data, but one may have extenuating circumstances that require different treatment. For example, in SLAs for insurance repair work, there may be significant differences between the expectations for performance of a non-catastrophic claim versus a catastrophic claim. In the case of a catastrophic claim, the desired time cycles for estimating and conducting repairs may be different than for a non-catastrophic claim. Thus, the procedure that should be used to quantify a time cycle criteria may be different in these two cases, and these differences would be reflected in the procedure selection parameters As an additional example, procedure selection parameters may indicate that where the data available for a criterion is primarily subjective data, such as customer satisfaction surveys, a procedure that includes the grouping of records into a number of qualitative categories should be used. Furthermore, procedure selection parameters may indicate that where only a subset of the records include performance data related to the customer service criterion, a procedure that includes selecting only the subset of records that include data should be used. For example, a customer service criterion may be based on customer satisfaction surveys but customer satisfaction survey data may be absent in many records. In such a case, a procedure that includes selecting only the subset of records that include data may be used, and this would be reflected in the procedure selection parameters. Values for the procedure selection parameters may be based on user input received via input interface 128.

After selecting the quantifying procedures, the quantifying module 104 uses the selected procedures to determine quantitative performance values. VQI module 106 then determines a VQI based on the quantitative performance values.

VQI module 106 may determine the VQI by determining a weighting factor for each quantitative performance value, multiplying each quantitative performance value by the corresponding weighting factor, and summing the products of the multiplied quantitative performance values and weighting factors. The weighting factors may be based on user input received via input interface 128. Weighting factors may be adjusted to focus the VQI on aspects of performance criteria that a user has determined to be the most important and/or to de-emphasize criteria that a user has determined to be less important. In an example use case, a user may set performance factors to indicate that a particular performance criterion is very important. At a subsequent point in time, the user may adjust the weighting factors to reflect that other performance criteria have become of greater importance.

Display module 108 may receive the data generated by the quantifying module 104 and VQI module 106 and generate data for the display of the received data. The display data may be communicated by the display module 108 to the printer driver 132 and to the printer 134, and the printer 134 may produce a printed version of the display data. The display data may be communicated to graphics subsystem 142 by display module 108 to display device 136, and display device 136 may render the display data to a user. An example visual depiction of the display data that may be generated by display module 108 and printed by printer 134 or rendered by display device 136 is described in detail below with reference to FIG. 4.

The display data generated by display module 108 may take various forms according to various implementations of display module 108 and computing system 150. For example, the generated display may represent the contents of an image, one or more pages in a document, or other visual artifact. The generated display data may be compressed or uncompressed image data according to a format such as Joint Photographic Experts Group (JPEG), Tagged Image File Format (TIFF), Scalable Vector Graphics (SVG), bitmap, or other format. The generated display data may be data or instructions interpretable by a window manager, desktop manager, graphical user interface, printer driver, graphics driver, word processor, document viewing or editing program, or other software or hardware component related to the implementation of a user interface and/or graphics.

Results analysis module 110 may receive the data generated by the quantifying module 104 and/or VQI module 106 and determine whether parameters used by the performance data module 100, aggregation module 102, quantifying module 104, and VQI module 108 should be changed. For example, results analysis module 110 may compare VQI values generated with respect to multiple vendors. If a large portion of the vendors have VQI values that exceed a threshold, the results analysis module 110 may adjust parameters used in other modules 100, 102, 104, 106 such that generated VQI values are lowered. Alternatively, if a large portion of vendors have VQI values that fall short of a threshold, the results analysis module 110 may adjust parameters used in other modules 100, 102, 104, 106 such that generated VQI values are raised. Parameters that may be changed by the results analysis module 110 include the performance value criteria, performance value sub-criteria, and weighting factors used by the other modules 100, 102, 104, 106.

Additionally, results analysis module 110 may perform electronic commerce or banking functionality based on data received from the quantifying module 104 and/or VQI module 106. Data indicating previous payments made to service providers may be available to results analysis module 110 in memory device 126 and/or via network interface 122. Payments to service providers may be contingent upon subsequent VQI, performance criteria values, and/or performance sub-criteria values, and rules that correlate performance to compensation may be stored in memory device 126. Results analysis module 110 may determine that, based on the compensation rules and the data received from the quantifying module 104 and/or VQI module 106, a debit or credit should be made against the account of a service provider. Results analysis module 110 may then initiate an electronic transaction to perform the determined debit or credit. For example, if results analysis module 110 determines that a service provider has exceeded a required VQI or service performance criteria or sub-criteria, the results analysis module 110 may initiate the payment of a bonus to the service provider. If the results analysis module 110 determines that a service provider has been overcompensated for work performed, the results analysis module 110 may initiate a debit on the account of the service provider. The results analysis module 110 may initiate the credit or debit via network interface 122 by utilizing a technology such as Electronic Funds Transfer (EFT) or other appropriate service or protocol.

Further, results analysis module 110 may analyze data received from the quantifying module 104 and/or VQI module 106 based on triggers, and alert users when a triggering event occurs. For example, a trigger may be set based on whether a service provider exceeds a required VQI, one or more performance criteria values, or one or more performance sub-criteria values. Alternatively, a trigger may be set based on whether a number of service providers have a required VQI, one or more performance criteria values, or one or more performance sub-criteria values. When a trigger condition exists, results analysis module 110 may generate an alert email to send to a user indicating that the trigger condition has been met. Alternatively, results analysis module 110 communicate with display module 108 to generate display data indicating that the trigger condition has been met. A corresponding alert may then be displayed to a user on display device 136. A user may use the alerts, for example, as a basis for renegotiating terms of an SLA with one or more service providers.

Computing system 150 may be implemented, for example, in a computer, System-on-a-Chip, or other computing or data processing device or apparatus. The processor 124 is configurable to execute instructions specifying the functionality of the modules 100, 102, 104, 106, 108, 110 as described above with reference to FIG. 1. The instructions may be stored in memory device 126 and/or in one or more additional computer-readable storage media (not depicted).

Figure 2:
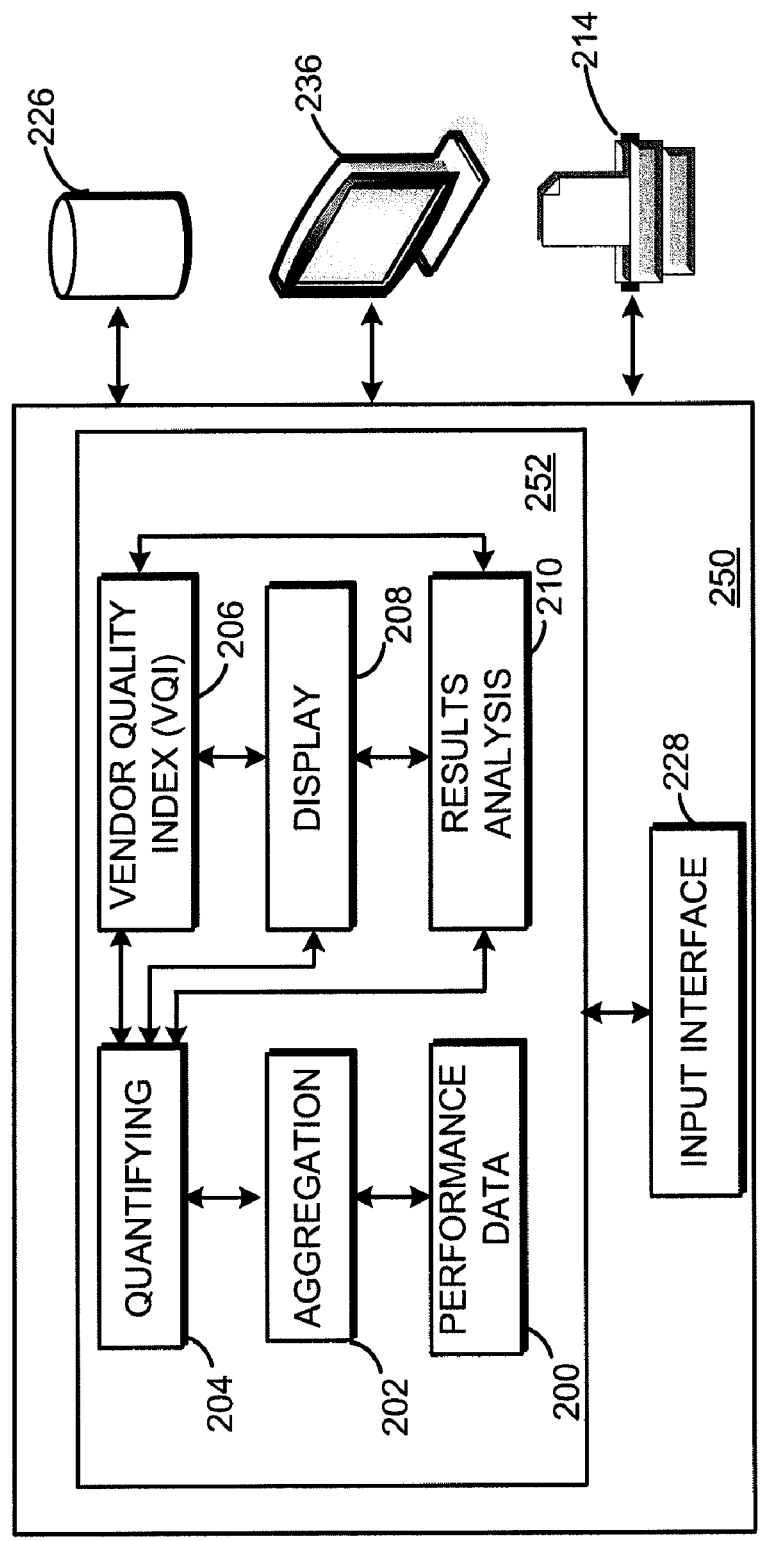
FIG. 2 shows a second example computing system for determining the Vendor Quality Index of a service provider on assignments tasked to the service provider.

FIG. 2 shows a second example computing system 250 for determining the VQI of a service provider on assignments tasked to the service provider. The example computing system 250 of FIG. 2 includes a subsystem 252 for evaluating service provider performance data, determining the VQI based on the performance data, and generating graphical output data to display results. Subsystem 252 includes: aggregation processor 202; quantifying processor 204 coupled to aggregation processor 202; VQI processor 206 coupled to quantifying processor 204; display processor 208 coupled to quantifying processor 204 and VQI processor 206; and results analysis processor 210 coupled to display processor 208, VQI processor 206, and quantifying processor 204. The various processors 200, 202, 204, 206, 208, 210 described with reference to FIG. 2 may be embodied in separate elements. Alternatively, two or more of the processors may coexist within a single processor element. Computing system 250 may optionally include input interface 228, and may optionally be in communication with memory device 226, display device 236, and printer 214.

The input interface 228 and processors 200, 202, 204, 206, 208, 210 perform the same or similar functions as described above with reference respectively to the corresponding input interface 128 and modules 100, 102, 104, 106, 108, 110 of FIG. 1. The performance data processor 200 may provide performance data to aggregation processor 202. The aggregation processor 202 may select one or more performance criteria from the available performance criteria. The aggregation processor 202 may then aggregate and classify the performance data in performance categories associated with the selected performance criteria. The quantifying processor 204 may select one or more quantifying procedures to use from a set of available quantifying procedures. The quantifying processor 204 may then generate the quantitative performance values by applying the selected quantifying procedures to the performance data as aggregated and classified by aggregation processor 202. VQI processor 206 may determine the VQI by determining a weighting factor for each quantitative performance value, multiply each quantitative performance factor by the corresponding weighting factor, and sum the products of the multiplied quantitative performance factors and weighting factors. Display processor 208 may receive the data generated by the quantifying processor 204 and VQI processor 206 and generate display data representing the received data. The display data created by the display processor 208 may be stored in memory device 226, rendered by display device 236, or printed by printer 214. An example visual depiction of the display data that may be generated by the display processor 208 is described in detail below with reference to FIG. 4. The results analysis processor 210 may adjust parameters used in other processors 200, 202, 204, 206, initiate electronic debits or credits to accounts corresponding to service providers, and/or generate alerts based on trends in generated VQIs and other data.

Computing system 250 may be implemented, for example, in a computer, System-on-a-Chip, or other computing or data processing device or apparatus. The processors 200, 202, 204, 206, 208, 210 are configurable to execute instructions specifying the functionality of the processors 200, 202, 204, 206, 208, 210 as described above. The instructions may be stored in ROMs or flash memories in the processors 200, 202, 204, 206, 208, 210 in memory device 226, and/or in one or more additional computer-readable storage media (not depicted).

Figure 3:
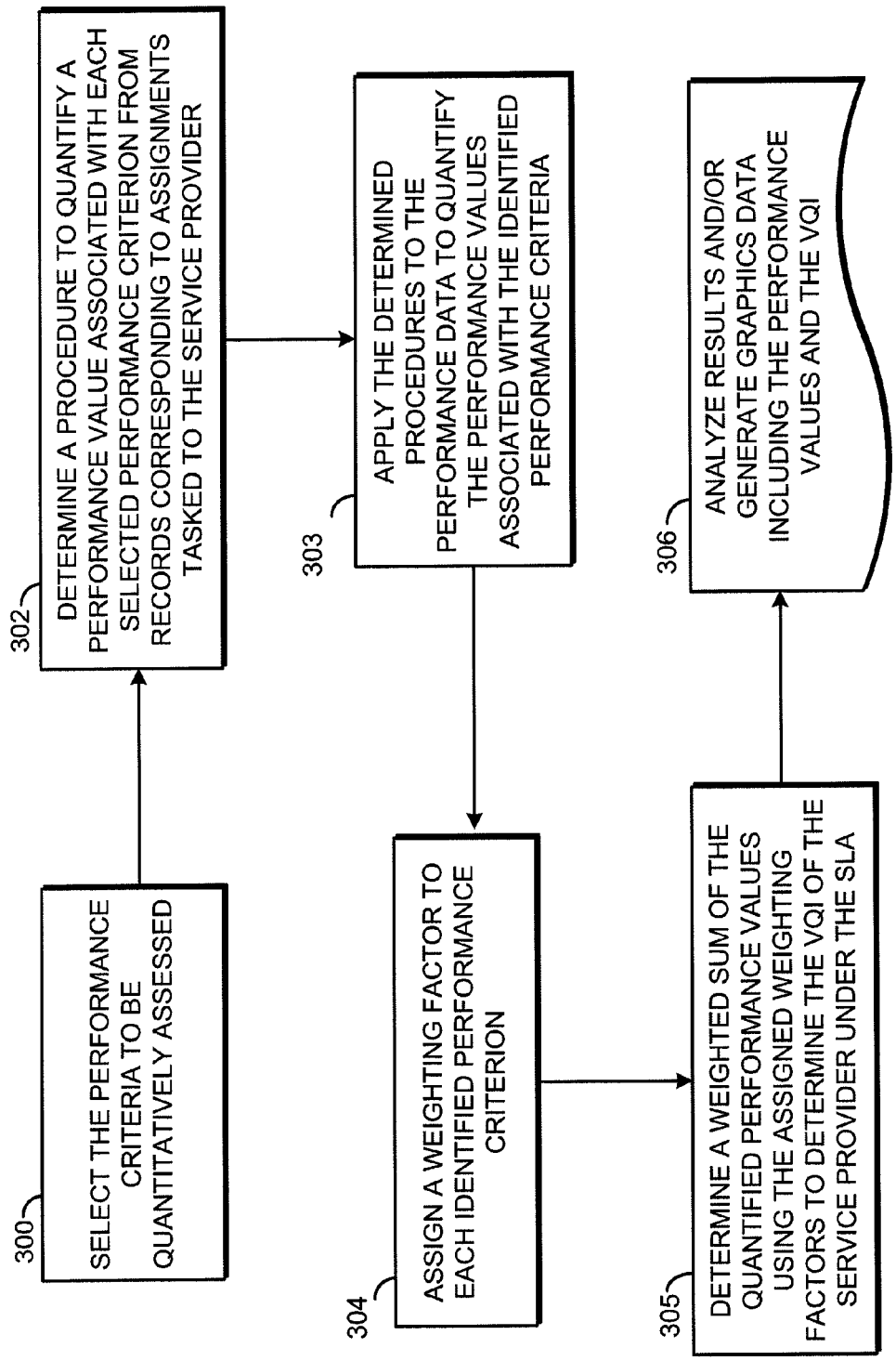
FIG. 3 is a flow diagram showing the functionality of the example computing systems of FIGS. 1 and 2.

FIG. 3 is a flow diagram showing the functionality of the subsystems 152, 252 of computing systems 150, 250 of FIGS. 1 and 2. The aggregation module 102 or aggregation processor 202 select 300 the performance criteria to be quantitatively assessed. The quantifying module 104 or quantifying processor 204 determine 302 procedures to use to quantify performance values associated with the selected performance criteria. The quantifying module 104 or quantifying processor 204 apply 303 the determined procedure to the performance data to quantify the performance values. The VQI module 106 or VQI processor 206 assign 304 a weighting factor to each selected performance criteria. The VQI module 106 or VQI processor 206 determine 305 a weighted sum of the quantified performance values to determine the VQI. The results analysis module 110 or results analysis processor 210 may analyze 306 generated VQIs and other data, and may determine to adjust operational parameters, initiate electronic transactions with service provider banks, and/or generate alerts based on trends in the generated VQIs and other data. The display module 108 or display processor 208 may generate 306 graphics data including the performance values and the VQI.

FIG. 4 shows an example depiction 400 of display data (also referred to as a "scorecard") that may be produced by the display module 108 or display processor 208 of FIGS. 1 and 2. The example scorecard 400 is separated into four quadrants 402, 404, 406, and 408 and includes VQI section 410 centered at the bottom of scorecard 400.

First quadrant 402 of scorecard 400 includes assignment cost statistics for the service provider. Assignment cost statistics shown in the first quadrant 402 include the number (net) of assignments, the total amount spent, and average job cost. The table shown in first quadrant 402 shows these cost statistics broken down according to quarters in the year and also shows a yearly total for each statistic.

Second quadrant 404 of scorecard 400 includes a quality of service summary for the service provider. The second quadrant 402 summarizes the procedure used by the quantifying module 104 or quantifying processor 204 to quantify a quality of service criterion for this service provider, and also shows a weighted performance value 414 and weighting factor 412 for this performance criterion.

As illustrated in second quadrant 404, the value for the quality of service criterion would be determined by quantifying module 104 or quantifying processor 204 based on weighted averages for values of two performance categories, namely reinspection results and customer quality index (CQI) results. In scorecard 400, the weighting factors for these two performance categories are each 50%, although different weighting factors may be used.

The value for the reinspection results performance category would be generated by the quantifying module 104 or quantifying processor 204 by comparing parameters that indicate the actual cost of performing assignments charged by the service provider and the reinspection costs determined by a claims adjuster. The quantifying module 104 or quantifying processor 204 would assign a standard reinspection value to records where the net deviation between the actual cost and the reinspection cost of an assignment is less than or equal to a defined percentage, i.e. a standard reinspection result. Otherwise, the quantifying module 104 or quantifying processor 204 would assign an unsatisfactory reinspection value to the record. As shown in this example, the value for the reinspection result performance category is based on the net deviation, up or down, between the actual cost and the reinspection cost, not just net increases.

The defined percentage used by the quantifying module 104 or quantifying processor 204 for the net deviation may be based on a number of factors including, but not limited to: the average cost of each assignment; the type of service provided by the service provider under an SLA; whether an assignment is designated as a catastrophe or a non-catastrophe; the length of time that the service provider has performed such assignments; or the number of such assignments the service provider has performed. Based on such factors, the defined percentage for the net deviation may often be in the range of about 3% to about 10%. In example scorecard 400 of FIG. 4, the defined percentage is 9%.

The quantifying module 104 or quantifying processor 204 would determine an average of the reinspection values to quantify the reinspection results. In example scorecard 400, the standard reinspection value is +1 and the unsatisfactory reinspection value is −1. In this example, an unsatisfactory reinspection value of −1 makes the final reinspection value very sensitive to unsatisfactory results.

The quantifying module 104 or quantifying processor 204 would determine the CQI results shown in quadrant 404 by grouping CQI values into three performance categories: standard CQIs; unsatisfactory CQIs; and marginal CQIs. In scorecard 400, CQI results were scored from 1.0 to 3.0 in half point increments. The quantifying module 104 or quantifying processor 204 would group CQIs 1.0 and 1.5 as unsatisfactory, 2.0 and 2.5 as marginal, and 3.0 as standard. In this example, the standard CQI value is +1, and the unsatisfactory CQI value is −1. Values for the marginal CQIs are not shown; however, the example determination shown in quadrant 404 reflects that the marginal CQI value may be considered as being zero, and that the overall CQI calculation may be considered as being an average of the CQI values of all of the assignments.

Third quadrant 406 of scorecard 400 shows a weighted cycle time performance value 418 that would be determined by quantifying module 104 or quantifying processor 204. The cycle time criterion value 418 is based on three performance categories: customer response time; job dispatch time; and verbal report time. Other cycle time performance categories (such as a customer contact time, an inspection time, an estimate submission time, or a written response time) may also be included. The quantifying module 104 or quantifying processor 204 would determine a complying fraction of the service provider assignments, i.e. those assignments for which the corresponding record indicates that the corresponding target value for the cycle time was exceeded. The quantifying module 104 or quantifying processor 204 would then average the complying fractions for the three cycle time performance categories to determine the cycle time performance value, which is then multiplied by weighting factor 416 (30%) to determine weighted cycle time performance value 418 in example scorecard 400.

Fourth quadrant 408 of scorecard 400 includes a weighted customer satisfaction performance value 422 that would be generated by the quantifying module 104 or quantifying processor 204 based on the results of customer satisfaction surveys. In this example, not every customer has completed a survey, and so not every record includes this performance data. Thus, the quantifying module 104 or quantifying processor 204 would identify a subset of the records that include customer satisfaction data, and then would determine a customer service value based on a fraction of records from the identified records that indicate that a specified customer satisfaction level was met. The quantifying module 104 or quantifying processor 204 may use this fraction as the quantified customer satisfaction criterion, which is then multiplied by weighting factor 420 (20%) to calculate weighted customer satisfaction performance value 422 in this example.

In example scorecard 400, the VQI is presented in VQI section 410, which is centered at the bottom of the scorecard. Different locations to display the VQI may be used, although the VQI section may be located in a position chosen to draw attention to the VQI. Thus, the VQI section may be located either at, or near, either the top of the scorecard or the bottom of the scorecard, separate from the four quadrants of other information.

As noted above, the VQI is a weighted average of the various performance values associated with the performance criteria. In the example of FIG. 4, these weighting factors are: quality of service weighting factor 412 (50%) for the quality of service criterion; cycle time weighting factor 416 (30%) for the cycle time criterion; and customer satisfaction weighting factor 420 (20%) for the customer satisfaction criterion. However, other weighting factors may be used. In many situations, the weighting factor assigned the quality of service criterion may be in the range of about 33% to about 60%; the weighting factor assigned to the cycle time criterion may be in the range of about 20% to about 40%; and the weighting factor assigned to the customer satisfaction criterion may be in the range of about 10% to about 25%.

In FIG. 4, the quantifying procedures used by the quantifying module 104 or quantifying processor 204 to quantify the performance criteria are determined such that the resulting performance values are normalized to be less than 1. When the weighting factors total to 1, this may have the effect, as seen in FIG. 4, that the VQI may be presented as a percentage where 100% represents ideal performance. The parameters described above, such as the percentage for net deviation, the values for classifying reinspections and CQIs, and the weighting factors, may be based on input from a user received via input interfaces 128, 228.

As seen in FIG. 4, the scorecard 400 may be rendered on a single page. This concise format has the advantage of allowing a user to ascertain important information regarding a service provider at a single glance. The example scorecard 400 shows, for example, the total volume and costs of assignments performed by the service provider 402, the weighted values for three service criteria 414, 418, 422, as well as the VQI 410.

Figure 5:
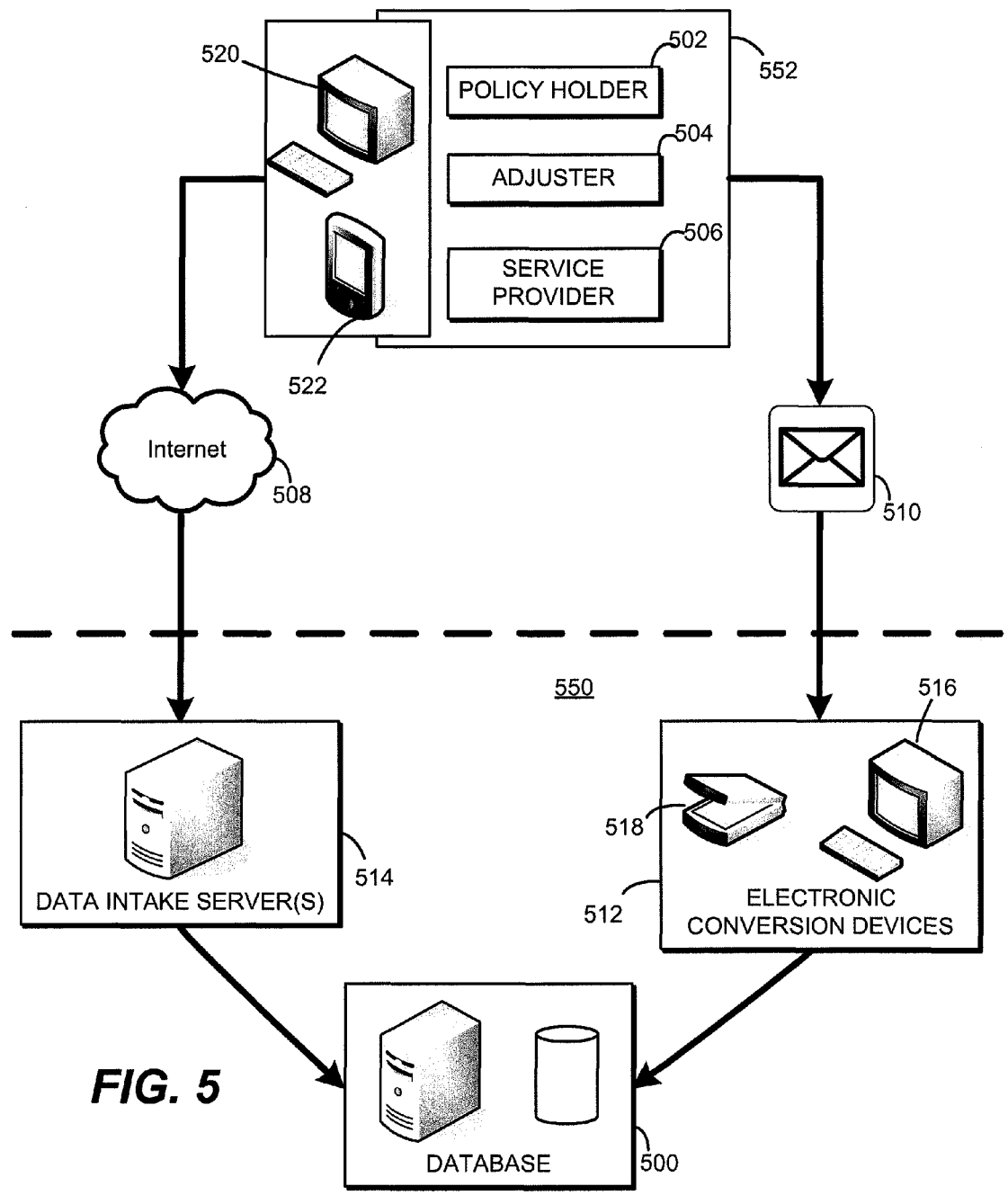
FIG. 5 shows an example architecture for the entry of data into a performance data database within the context of an insurance company.

FIG. 5 shows an example architecture for the entry of data into a performance data database 500 within the context of an insurance company 550. The database 500 of FIG. 5 may be used, for example, as a source of performance data for the example computing systems 150, 250 of FIGS. 1 and 2, and may be in communication with performance data module 100 or performance data processor 200.

Data providers 552 direct the communication of performance data to the insurance company 550, and the data providers 552 include but are not limited to policy holders 502, adjusters 504, and service providers 506. A policy holder 502 may communicate information to the insurance company 550 such as how well a service provider 506 has met cycle times. An adjuster 504 may communicate information to the insurance company 550 such as the anticipated cost for the performance of an assignment (the "reinspection cost") and the actual cost for an assignment charged by a service provider 506. A service provider 506 may communicate information to the insurance company 550 such as invoices and descriptions of the procedures used in performing assignments.

The communication of data may be performed by the data providers 552 in electronic form through an electronic communications network such as the Internet 508. This communication is performed, for example, through devices such as a computer 520 and/or a hand-held computing devices 522 operated by the data providers 552. Data may be received at the insurance company 550 at one or more data intake servers 514. The data intake servers may include, for example, a web server and/or application server that serves a web application to allow the data providers 552 to enter data via a web form. Alternatively, the data intake server may receive data from custom data entry client applications operated by the data providers 552. The data intake server 514 may be implemented on a single computer or multiple computers. Other data may be delivered by the data providers 552 through non-electronic delivery 510. Non-electronic delivery 510 may be accomplished, for example, through the transmission of information verbally via telephone or through physical hardcopies via mail or direct delivery. When data is delivered in a non-electronic form, the data must be converted into an electronic format before it may be added to the database 500. Converting to an electronic form may be performed using one or more electronic conversion devices 512. For example, data may be entered manually into a computer 516 via one or more input devices. Additionally, conversion devices such as a scanner 518 may be used. A scanner 518 may implement technology such as Optical Character Recognition (OCR), and may generate text and/or image data based on the physical materials provided by the data providers 552.

After data is converted using electronic conversion devices 512 or received at the data intake server 514, the data may be additionally modified or supplemented prior to or after its entry in the performance database 500. For example, additional data fields such as a subjective customer quality index (CQI) may be added to the data. CQI values may be based on factors such as whether procedures were followed properly during performance of the assignment.

The database 500 may be implemented differently according to the requirements of insurance company 550. For example, the database 500 may be one or more flat files, spreadsheets, structured files, relational database management systems (RDBMSs) or other data storage programs. The database 500 may operate on a single computer, multiple computers, and/or in a dedicated data center.

Although the features and elements described above with reference to FIGS. 1-5 are described in particular combinations, each feature or element may be used alone without the other features and elements or in various combinations with or without other features and elements.

What is claimed is:

1. An apparatus for determining a vendor quality index (VQI) of a service provider, the apparatus comprising:
a memory device, configured to receive service provider performance data related to services performed by the service provider, the service provider performance data including subjective performance data; and
a processor, configured to:
select a plurality of performance criteria;
determine, for each of the plurality of performance criteria, a quantified performance criterion value based on the service provider performance data, wherein, for at least one performance criterion of the plurality of performance of performance criteria, the processor is configured to:
for each record from a plurality of records in the service provider data that include subjective performance data, assign the record to a category from a plurality of categories based a performance data value in the record, wherein each category from the categories corresponds to a respective range of performance data values, wherein the record is assigned to the category based on whether the performance data value in the record is within the range of performance data values to which the category corresponds, and
wherein each category of the categories corresponds to a respective quantitative category value;
determine, for each record of the assigned records, the quantitative category value that corresponds to the category to which the record is assigned; and
determine the quantified performance criterion value as an average of the determined quantitative category values; and
determine the VQI as a weighted sum based on the performance criterion values and a plurality of weighting factors;
wherein, for the at least one performance criterion:
the plurality of categories includes an "unsatisfactory" category and a "satisfactory" category;
the "unsatisfactory" category corresponds to a range of performance data values from zero to four and corresponds to a quantitative category value of zero; and
the "satisfactory" category corresponds to a range of performance data values from five to ten and corresponds to a quantitative category value of one.

2. The apparatus of claim 1 wherein the selected performance criteria include at least one of: a quality of service criterion; a cycle time criterion; and a customer satisfaction criterion.

3. The apparatus of claim 1 wherein the processor is further configured to:
determine at least one of the performance criterion values as a weighted sum based on a plurality of quantified performance sub-criterion values and a plurality of weighting factors assigned to the performance sub-criterion values.

4. The apparatus of claim 3 wherein the performance sub-criterion values relate to one or more performance sub-criteria including: actual assignment cost; assignment reinspection cost; Customer Quality Index (CQI); audit results; Physical Damage Audit (PDA) results; periodic business review results; vendor self-assessment results; customer response time; customer contact time; inspection time; estimate submission time; job dispatch time; verbal report time; written report time; Additional Living Expense (ALE) results; contractor services time; and environmental rating.

5. The apparatus of claim 1 wherein the processor is further configured to:
determine at least one of the performance criterion values based on record values in the service provider performance data that exceed a target performance value.

6. The apparatus of claim 1 wherein the processor is further configured to:
generate display data based on the performance criterion values and the VQI.

7. The apparatus of claim 6 wherein the display data represents a page in a document, the page including:
a first region indicating assignment cost statistics for the service provider;
a second region indicating a quality of service summary for the service provider;
a third region indicating a cycle time summary for the service provider;

a fourth region indicating a customer satisfaction summary for the service provider; and a fifth region indicating the VQI.

8. The apparatus of claim 1 wherein the processor is further configured to credit or debit an account corresponding to the service provider based on at least one of the quantitative performance values.

9. A non-transitory computer-readable medium having processor-executable instructions stored thereon which, when executed by at least one processor, will cause the at least one processor to perform a method for determining a vendor quality index (VQI) of a service provider, the method comprising:

receiving service provider performance data stored in at least one memory device, the service provider performance data related to services performed by the service provider and including subjective performance data;

selecting a plurality of performance criteria stored in the at least one memory device;

determining, for each of the plurality of performance criteria, a quantified performance criterion value based on the service provider performance data, wherein, for at least one performance criterion of the plurality of performance criteria, the determining the quantified performance criterion value includes:

for each record from a plurality of records in the service provider data that include subjective performance data, assigning the record to a category from a plurality of categories based on a performance data value in the record, wherein each category from the categories corresponds to a respective range of performance data values, wherein the record is assigned to the category based on whether the performance data value in the record is within the range of performance data values to which the category corresponds, and wherein each category of the categories corresponds to a respective quantitative category value;

determining, for each record of the assigned records, the quantitative category value that corresponds to the category to which the record is assigned; and determining the quantified performance criterion value based on the determined quantitative category values;

storing the quantified performance criterion values in the at least one memory device;

determining the VQI as a weighted sum based on the performance criterion values and a plurality of weighting factors; and storing the VQI in the at least one memory device;

wherein: the plurality of categories includes an "unsatisfactory" category and a "satisfactory" category;

the "unsatisfactory" category corresponds to a range of performance data values from zero to four and corresponds to a quantitative category value of zero; and the "satisfactory" category corresponds to a range of performance data values from five to ten and corresponds to a quantitative category value of one.

10. The non-transitory computer-readable medium of claim 9 wherein the selected performance criteria include at least one of: a quality of service criterion; a cycle time criterion; and a customer satisfaction criterion.

11. The non-transitory computer-readable medium of claim 9 wherein the method further comprises:

determining at least one of the performance criterion values as a weighted sum based on a plurality of quantified performance sub-criterion values and a plurality of weighting factors assigned to the performance sub-criterion values.

12. The non-transitory computer-readable medium of claim 11 wherein the performance sub-criterion values relate to one or more performance sub-criteria including: actual assignment cost; assignment reinspection cost; Customer Quality Index (CQI); audit results; Physical Damage Audit (PDA) results; periodic business review results; vendor self-assessment results; customer response time; customer contact time; inspection time; estimate submission time; job dispatch time; verbal report time; written report time; Additional Living Expense (ALE) results; contractor services time; and environmental rating.

13. The non-transitory computer-readable medium of claim 9 wherein the method further comprises:

determining at least one of the performance criterion values based on record values in the service provider performance data that exceed a target performance value.

14. The non-transitory computer-readable medium of claim 9 wherein the method further comprises:

generating display data based on the performance criterion values and the VQI; and storing the display data in the at least one memory device.

15. The non-transitory computer-readable medium of claim 14 wherein the display data represents a page in a document, the page including:

a first region indicating assignment cost statistics for the service provider;

a second region indicating a quality of service summary for the service provider;

a third region indicating a cycle time summary for the service provider;

a fourth region indicating a customer satisfaction summary for the service provider; and a fifth region indicating the VQI.

16. The non-transitory computer-readable medium of claim 9 wherein the method further comprises:

performing a credit or debit on an account corresponding to the service provider based on at least one of the quantitative performance values.

17. A computer-implemented method for determining a vendor quality index (VQI) of a service provider, the method comprising:

at least one processor receiving service provider performance data related to services performed by the service provider, the service provider performance data including subjective performance data;

the at least one processor selecting a plurality of performance criteria;

the at least one processor determining, for each of the plurality of performance criteria, a quantified performance criterion value based on the service provider performance data, wherein, for at least one performance criterion of the plurality of performance criteria, the determining the quantified performance criterion value includes:

for each record from a plurality of records in the service provider data, assigning the record to a category from a plurality of categories based on a performance data value in the record, wherein each category from the categories corresponds to a respective range of performance data values, wherein the record is assigned to the category based on whether the performance data value in the record is within the range of performance data values to which the category corresponds, and wherein each category of the categories corresponds to a respective quantitative category value;

determining, for each record of the assigned records, the quantitative category value that corresponds to the category to which the record is assigned; and determining the quantified performance criterion value based on the determined quantitative category values; and the at least one processor determining the VQI as a weighted sum based on the performance criterion values and a plurality of weighting factors;

wherein: the plurality of categories includes an "unsatisfactory" category and a "satisfactory" category;

the "unsatisfactory" category corresponds to a range of performance data values from zero to four and corresponds to a quantitative category value of zero; and the "satisfactory" category corresponds to a range of performance data values from five to ten and corresponds to a quantitative category value of one.

18. The method of claim 17 wherein the selected performance criteria include at least one of: a quality of service criterion; a cycle time criterion; and a customer satisfaction criterion.

19. The method of claim 17 wherein the method further comprises:
the processor determining at least one of the performance criterion values as a weighted sum based on a plurality of quantified performance sub-criterion values and a plurality of weighting factors assigned to the performance sub-criterion values.

20. The method of claim 19 wherein the performance sub-criterion values relate to one or more performance sub-criteria including: actual assignment cost; assignment reinspection cost; Customer Quality Index (CQI); audit results; Physical Damage Audit (PDA) results; periodic business review results; vendor self-assessment results; customer response time; customer contact time; inspection time; estimate submission time; job dispatch time; verbal report time; written report time; Additional Living Expense (ALE) results; contractor services time; and environmental rating.

21. The method of claim 20 wherein the method further comprises:
the at least one processor determining at least one of the performance criterion values based on record values in the service provider performance data that exceed a target performance value.

22. The method of claim 17 wherein the method further comprises:
the at least one processor generating display data based on the performance criterion values and the VQI.

23. The method of claim 22 wherein the display data represents a page in a document, the page including:
a first region indicating assignment cost statistics for the service provider;
a second region indicating a quality of service summary for the service provider;
a third region indicating a cycle time summary for the service provider;
a fourth region indicating a customer satisfaction summary for the service provider; and
a fifth region indicating the VQI.

24. The method of claim 23 wherein the first region is positioned in an upper left quarter of the page, the second region is positioned in a bottom left quarter of the page, the third region is positioned in upper right quarter of the page, the fourth region is positioned in a bottom right quarter of the page, and the fifth region is positioned at a bottom or a top of the paged and is centered horizontally on the page.

* * * * *